(12) United States Patent
Bicheno et al.

(10) Patent No.: US 7,552,396 B1
(45) Date of Patent: Jun. 23, 2009

(54) ASSOCIATING SCREEN POSITION WITH AUDIO LOCATION TO DETECT CHANGES TO THE PERFORMANCE OF AN APPLICATION

(75) Inventors: Richard M. Bicheno, Havant (GB); Tim Dunn, Warnford (GB); Ian P. Hurworth, Eastleigh (GB); John B. Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,106

(22) Filed: Apr. 4, 2008

(51) Int. Cl.
G06F 3/048 (2006.01)
(52) U.S. Cl. .................. 715/766; 715/736; 715/772; 717/127
(58) Field of Classification Search ............ 715/766, 715/736, 772; 717/127
See application file for complete search history.

(56) References Cited

U.S. PATENT DOCUMENTS

| | | | |
|---|---|---|---|
| 4,713,669 A | 12/1987 | Shuch | |
| 4,777,474 A | 10/1988 | Clayton | |
| 5,463,775 A * | 10/1995 | DeWitt et al. | 702/186 |
| 5,485,574 A * | 1/1996 | Bolosky et al. | 714/35 |
| 5,533,182 A * | 7/1996 | Bates et al. | 715/727 |
| 5,659,693 A * | 8/1997 | Hansen et al. | 715/779 |
| 5,720,018 A | 2/1998 | Muller et al. | |
| 5,822,758 A * | 10/1998 | Loper et al. | 711/130 |
| 5,872,976 A * | 2/1999 | Yee et al. | 717/127 |
| 5,909,550 A * | 6/1999 | Shankar et al. | 709/227 |
| 5,999,178 A * | 12/1999 | Hwang et al. | 715/787 |
| 6,049,798 A | 4/2000 | Bishop et al. | 707/10 |
| 6,128,016 A * | 10/2000 | Coelho et al. | 715/808 |
| 6,199,199 B1 * | 3/2001 | Johnston et al. | 717/107 |
| 6,243,838 B1 * | 6/2001 | Liu et al. | 714/57 |
| 6,256,775 B1 * | 7/2001 | Flynn | 717/127 |
| 6,493,002 B1 * | 12/2002 | Christensen | 715/779 |
| 6,496,872 B1 * | 12/2002 | Katz et al. | 719/318 |

(Continued)

OTHER PUBLICATIONS http://www.usatoday.com/travel/columnist/getline/2006-01-16-ask-the-captain_x.htm.

(Continued)

*Primary Examiner*—Weilun Lo
*Assistant Examiner*—Tuyetlien T Tran
(74) *Attorney, Agent, or Firm*—Oppenheimer Wolff & Donnelly LLP

(57) ABSTRACT

A method for monitoring the performance of an application comprises determining an output of an application that requires monitoring, assigning an audible sound to the output, positioning an output display window at a desired location on a performance monitoring screen, determining a baseline for the output when the application is in the state of equilibrium, monitoring the output to detect a change relative to the baseline, emitting the audible sound assigned to the output from the sound location and bringing the display window into focus on the performance monitoring screen when the detected change varies from the baseline by a predetermined amount, and adjusting the configurable parameters of the audible sound to indicate the existence of the detected change, the magnitude of the detected change relative to the baseline, and the degree of deviation from the baseline, wherein an amplitude of the audible sound is adjusted to indicate the magnitude of the detected change from the baseline, and wherein a pitch of the audible sound is adjusted to indicate a positive change or a negative change from the baseline.

1 Claim, 2 Drawing Sheets

U.S. PATENT DOCUMENTS

| | | | |
|---|---|---|---|
| 6,532,005 B1 * | 3/2003 | Campbell | 345/173 |
| 6,593,940 B1 * | 7/2003 | Petersen et al. | 715/700 |
| 6,639,614 B1 * | 10/2003 | Kosslyn et al. | 715/837 |
| 6,668,169 B2 * | 12/2003 | Burgan et al. | 455/435.1 |
| 6,671,830 B2 * | 12/2003 | Kaler et al. | 714/39 |
| 6,704,012 B1 * | 3/2004 | Lefave | 345/440 |
| 6,895,577 B1 * | 5/2005 | Noble et al. | 717/126 |
| 6,901,582 B1 * | 5/2005 | Harrison | 717/127 |
| 6,947,062 B2 | 9/2005 | Cuijpers et al. | |
| 7,103,876 B1 * | 9/2006 | Lopez et al. | 717/127 |
| 7,133,531 B2 * | 11/2006 | Karpenstein | 381/119 |
| 7,168,012 B2 * | 1/2007 | Clauss et al. | 714/57 |
| 7,240,244 B2 * | 7/2007 | Teegan et al. | 714/38 |
| 7,272,823 B2 * | 9/2007 | Ball | 717/125 |
| 7,336,256 B2 * | 2/2008 | Parzygnat et al. | 345/156 |
| 7,434,208 B2 * | 10/2008 | Kirkpatrick et al. | 717/131 |
| 2003/0061324 A1 * | 3/2003 | Atherton et al. | 709/223 |
| 2003/0105973 A1 * | 6/2003 | Liang et al. | 713/200 |
| 2003/0142143 A1 * | 7/2003 | Brown et al. | 345/836 |
| 2003/0225876 A1 * | 12/2003 | Oliver et al. | 709/224 |
| 2005/0039132 A1 * | 2/2005 | Germain et al. | 715/736 |
| 2005/0055646 A1 | 3/2005 | Melzer | |
| 2005/0144025 A1 * | 6/2005 | Katz et al. | 705/1 |
| 2005/0193376 A1 * | 9/2005 | Harrison | 717/127 |
| 2005/0216858 A1 | 9/2005 | Fabritius | |
| 2005/0248588 A1 * | 11/2005 | Freeman et al. | 345/660 |
| 2006/0005142 A1 | 1/2006 | Karstens | |
| 2006/0059474 A1 * | 3/2006 | Bhansali et al. | 717/151 |
| 2006/0129992 A1 * | 6/2006 | Oberholtzer et al. | 717/124 |
| 2006/0224986 A1 | 10/2006 | Lindsay et al. | |
| 2006/0236255 A1 | 10/2006 | Lindsay et al. | |
| 2006/0247927 A1 * | 11/2006 | Robbins et al. | 704/225 |
| 2006/0259274 A1 * | 11/2006 | Greco et al. | 702/182 |
| 2006/0285489 A1 * | 12/2006 | Francisco et al. | 370/229 |
| 2007/0011300 A1 * | 1/2007 | Hollebeek et al. | 709/224 |
| 2007/0028243 A1 * | 2/2007 | Berry et al. | 718/104 |
| 2007/0150949 A1 * | 6/2007 | Futamura et al. | 726/22 |
| 2008/0270077 A1 * | 10/2008 | Ozonat et al. | 702/186 |

OTHER PUBLICATIONS

"Visual-Aural Representations of Performance for a Scalable Application Program," *Scalable High Performance Computing Conference, 1992. SHPCC-92. Proceedings*, Apr. 26-29, 1992; pp. 433-440. Francioni, J.M.; Rover, D.T.

AMS-2000 Altitude Alert System (8900) http://www.edmo.com/index.php?module=products&func=display&prod_id=17093, Mar. 27, 2008.

Audio Emergency Warning Systems http://www.magnalabs.com/audiofacts.1.htm, Mar. 27, 2008.

3-D Audio Traffic Alert and Collision Avoidance System http://human-factors.arc.nasa.gov/ihh/spatial/research/Begault_3d_collision_avoidance.html, Mar. 27, 2008.

http://en.wikipedia.org/wiki/Ground_proximity_warning_system, Mar. 27, 2008.

\* cited by examiner

ASSOCIATING SCREEN POSITION WITH AUDIO LOCATION TO DETECT CHANGES TO THE PERFORMANCE OF AN APPLICATION

FIELD OF THE INVENTION

The present invention relates in general to a system and method for monitoring the performance of one or more applications. More particularly, the present invention relates to a system and method for monitoring the performance of an application that includes monitoring a number of outputs and emitting audio sounds in combination with visual displays in order to indicate a change in performance.

BACKGROUND OF THE INVENTION

The job of a computer systems analyst or test engineer commonly includes running performance tests to monitor the performance of one or more applications on a computer system. Presently, when running performance tests against an application, it is necessary to measure and monitor multiple outputs. For example, when monitoring a messaging application, the outputs that require monitoring may include, but are not limited to, message throughput rate, memory utilization, CPU utilization, disk utilization, and java heap allocations.

Typically, the monitored outputs have been recorded and viewed in visual (e.g. textual or graphical) form on a computer screen. When monitoring a performance test in real-time it is often difficult to view the results from all of these outputs at once. One reason for this is because different tools, utilities, or applications track each of the outputs, and therefore, the data may be spread across several windows and/or screens. Furthermore, viewing and analyzing the data in real-time requires dedicated attention and screen usage. As a result, the longer a test runs the easier it is to miss an important event. For example, if the message throughput rate declines due to an increase in memory usage, the analyst may notice the change in message throughput rate but not the increase in memory usage unless both windows have his or her full attention. Thus, it becomes apparent that visual monitoring requires 100% cognitive focus. This is inefficient when changes in the state of the performance of an application must be monitored over an extended period of time. Therefore, visual monitoring alone is not ideal and may be unreliable and susceptible to numerous errors.

Currently, "dashboard" performance monitoring applications are available that may alert a user to a change by simply sounding an alarm. With these applications, the user must actively switch back to using the monitoring application in order to identify what has changed, and to what extent. Thus, with these "dashboard" monitoring type applications, the user may have missed key points by the time he or she has switched back to the monitoring application. As a result, such monitoring type applications are also error prone and unreliable.

Therefore, there is a need for a system and method for testing the performance of one or more applications that enables monitoring to be performed by means that includes both visual and audible alarms.

BRIEF SUMMARY OF THE INVENTION

The present invention solves the foregoing problems by providing a method for monitoring the performance of an application comprising determining an output of an application that requires monitoring, assigning an audible sound to the output, positioning an output display window at a desired location on a performance monitoring screen, determining a baseline for the output when the application is in the state of equilibrium, monitoring the output to detect a change relative to the baseline, emitting the audible sound assigned to the output from the sound location and bringing the display window into focus on the performance monitoring screen when the detected change varies from the baseline by a predetermined amount, and adjusting the configurable parameters of the audible sound to indicate the existence of the detected change, the magnitude of the detected change relative to the baseline, and the degree of deviation from the baseline. The output of the application that is being monitored represents a performance metric associated with the application, and the baseline represents an output level that is substantially constant. The selected location of the output display window on the performance monitoring screen determines a sound location from which the audible sound associated with the output will be emitted, and the audible sound is emitted from the sound location by adjusting a phase of the audible sound. An amplitude of the audible sound may be adjusted to indicate the magnitude of the detected change from the baseline, and a pitch of the audible sound may be adjusted to indicate a positive change or a negative change from the baseline.

DETAILED DESCRIPTION OF THE INVENTION

As is well-known to those skilled in the art, a test program may be run on a computer system that monitors various performance outputs for an application and reports changes in performance through a visual display. These performance metrics include, but are not limited to, message throughput rate, memory utilization, CPU utilization, disk utilization, and java heap allocations.

In general, the present invention includes an application performance monitoring system and method that utilizes audible sounds and visual displays to represent a change in the performance of an application. More particularly, rather than having to constantly view and keep track of numerous outputs during a performance test, the present invention utilizes audible sounds and display "windows" that momentarily come into focus to represent a change in the performance of an application. The outputs that are being monitored may come from multiple sources, such as Windows Task Manager, the application calculating the message throughput rate, command line windows, and the like.

As will be discussed in further detail to follow, the system and method of the present invention first assigns each output a unique audible sound. Then, the output display windows corresponding to the outputs being monitored are positioned at desired locations on the user's screen. Each output is then monitored against a "baseline," which is determined from a state of equilibrium. If the output varies from the baseline by an amount greater than an accepted tolerance level or variation factor, then one or more audible sounds are emitted signaling the change in performance. The amplitude, pitch, phase, and frequency may be utilized to indicate characteristics of the change, such as the magnitude of the change in performance. When the audible sounds are emitted to the user-defined sound location, the window associated with that location may be brought back into focus on the user's screen giving the user the opportunity to listen to the audio output and visually monitor the output at the same time.

As will be appreciated by those skilled in the art, one advantage of using both audible sounds and visual displays to alert the user to a change in performance is that the user may continue with other work and with a reduced cognitive overhead when there are no changes and the state is in equilibrium. Thus, the present invention provide means of relating the audible sounds back to the source to enable the user to easily monitor the performance both audibly and visually. The benefits provided by the present invention increase as the duration of the test increases.

Figure 1A:
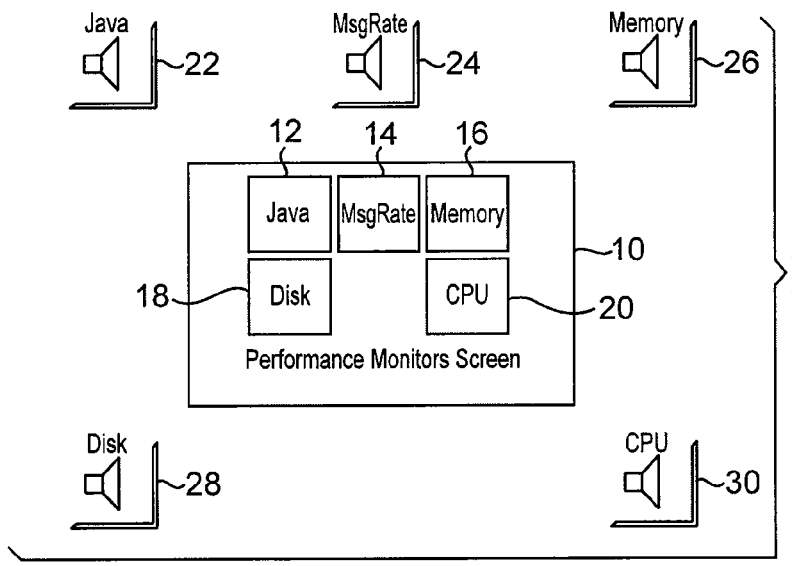
FIGS. 1A-1C are diagrams illustrating the ability of the user to configure the location of display windows on a performance monitoring screen and the corresponding sound locations associated with the screen position of the various display windows.
Figure 1B:
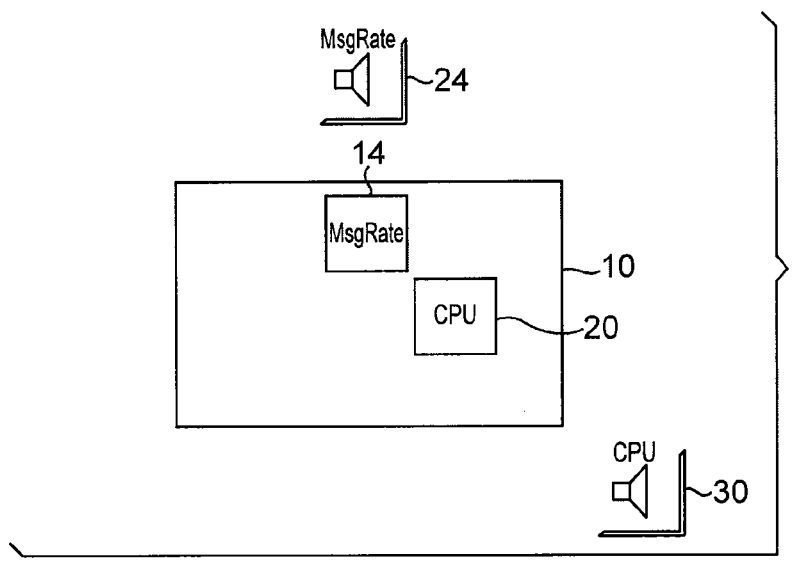
Figure 1C:
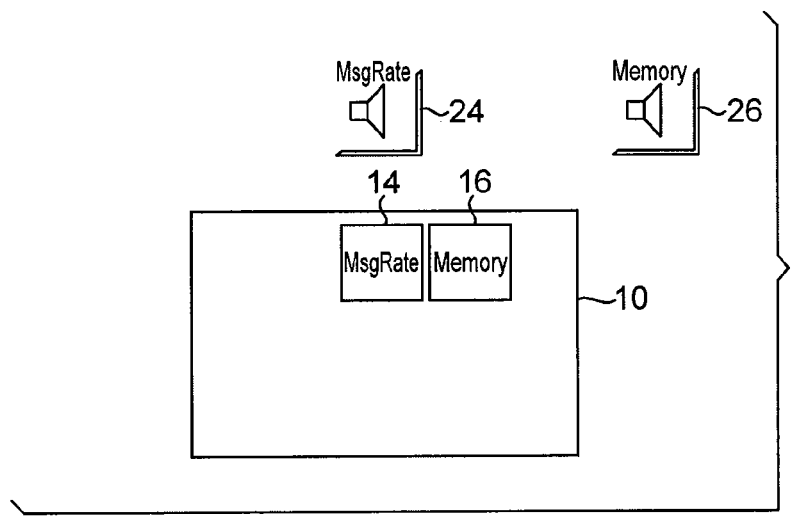

FIGS. 1A-1C are diagrams illustrating the ability of the user to configure the location of display windows on the user's screen and the corresponding sound locations associated with the screen position of the various display windows. In particular, FIG. 1A is a diagram illustrating performance monitor screen 10, which includes Java window 12, MsgRate window 14, Memory window 16, Disk window 18, and CPU window 20. FIG. 1A also illustrates the corresponding sound locations that result from the positioning of the display windows in the configuration shown. In particular, Java sound location 22 is positioned to the front-left of screen 10, MsgRate sound location 24 is positioned to the front of screen 10, Memory sound location 26 is positioned to the front-right of screen 10, Disk sound location 28 is positioned to the back-left of screen 10, and CPU sound location 30 is positioned to the back-right of screen 10. The positioning of, for example, Java sound location 22 to the front-left of screen 10 means that when the audible sound associated with the Java output is emitted, the user will perceive that the audible sound is being emitted from the front and to the left of screen 10. Furthermore, Java window 12 will come into focus in the upper-left side of screen 10 so that the user may visually as well as audibly receive an indication that the Java output has experienced a change. As will be appreciated by those skilled in the art, display windows 12-20 may be repositioned such that, for example, Java window 12 and the corresponding Java sound location 22 are moved to the back-left of screen 10 where Disk window 18 is now positioned.

FIG. 1B is a diagram illustrating an increase in the MSGRate and CPU outputs. Accordingly, MsgRate window 14 and CPU window 20 are re-focused such that they are once again visible in their defined screen positions, which results in one audible sound being emitted from MsgRate sound location 24 at the front of screen 10 and another audible sound being emitted from CPU sound location 30 at the back-right of screen 10.

FIG. 1C is a diagram illustrating a further change to the outputs, wherein now the MsgRate output has dropped, the CPU output is close to the baseline, and the Memory output increases. Accordingly, MsgRate window 14 and Memory window 16 are re-focused such that they are once again visible in their defined screen positions, which results in one audible sound being emitted from MsgRate sound location 24 at the front of screen 10 and another audible sound being emitted from Memory sound location 26 at the front-right of screen 10.

In one embodiment, it may be possible to emit audible sounds from "perceived" sound locations, such as front, back-left, etc., by adjusting the phase of the audible sounds. This type of "two-dimensional" or "three-dimensional" sound may be achieved with as few as two speakers and utilizing existing technology that is known to those skilled in the art. Thus, when the user is sitting in front of screen 10, he or she will perceive the audible sounds being emitted from the various sound locations even though there is not a physical speaker positioned at that location. When the output display windows are repositioned on screen 10, the phase of the audible sounds may be automatically adjusted accordingly such that the audible sound locations match the screen position. Alternatively, any number of speakers may be coupled to the computer system running the application and positioned around the user at desired locations in order to physically produce two or three-dimensional audible sounds without having to rely on adjusting the phase of the sounds themselves in order to achieve the effect.

Figure 2:
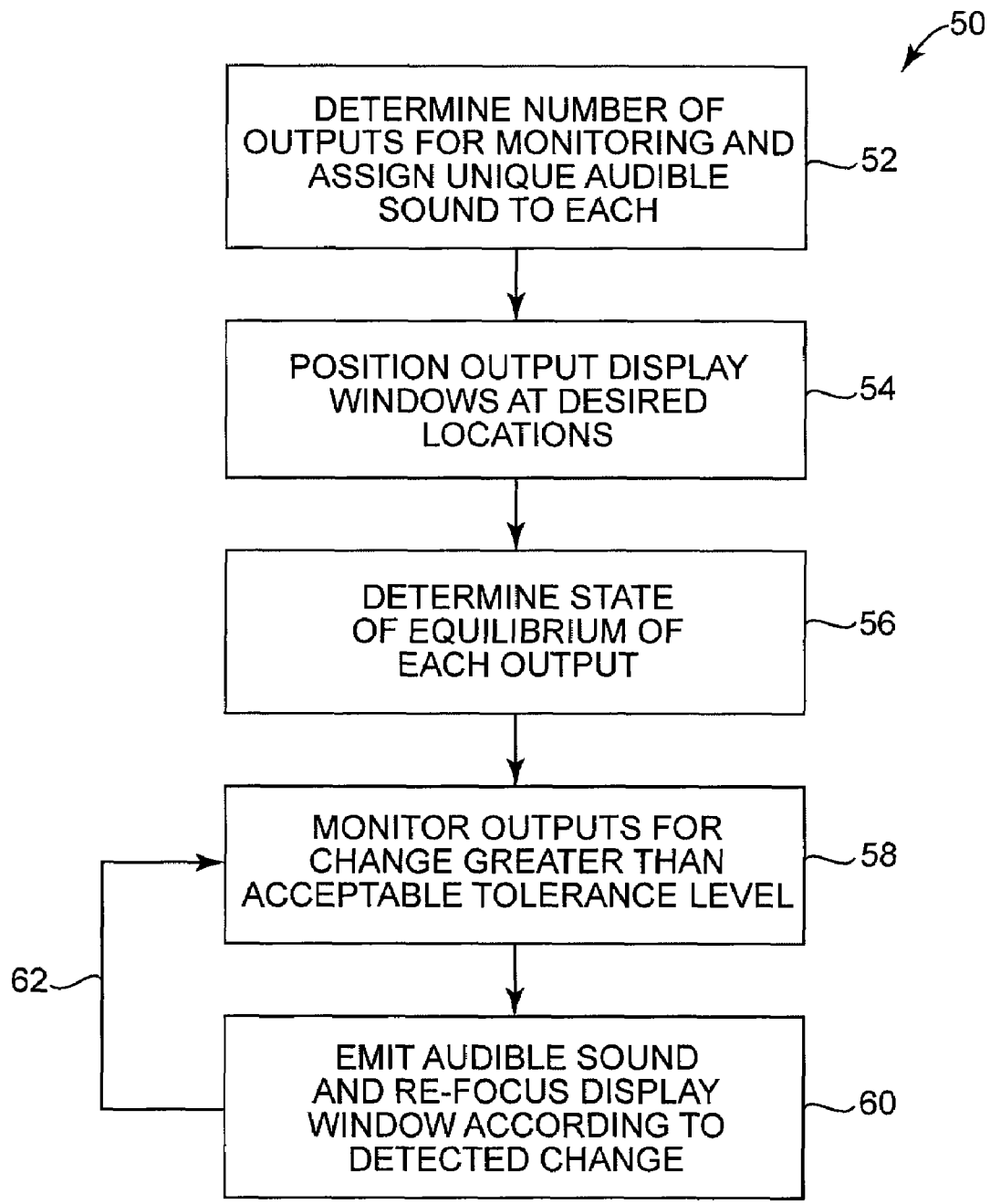
FIG. 2 is a flowchart illustrating one exemplary method of monitoring the performance of an application using audible sounds in combination with visual displays to represent changes in various outputs related to the performance.

FIG. 2 illustrates one exemplary embodiment of a performance monitoring method 50 in accordance with the present invention. Performance monitoring method 50 begins at step 52, wherein the number of outputs that require monitoring is determined, and a unique audible sound is assigned to each of the outputs.

After assigning a unique audible sound to each of the outputs, the method continues at step 54 where the user positions the output display windows corresponding to the various outputs being monitored at desired locations on the performance monitor screen. As discussed above, the position of the output display windows on the performance monitor screen directly correlates with the sound location of the corresponding audible sounds for the outputs.

Method 50 continues at step 56 where the state of equilibrium (i.e., "normal" performance) of each of the outputs is determined. In a state of equilibrium, no audio is emitted and the display windows are not visible on the screen.

For example, in a messaging application, the state of equilibrium may be the point after which the startup processing of the application has completed, the runtime processing has been warmed up (e.g. all Java just-in-time code compilation has completed), and the application has reached a point where an approximately constant throughput rate may be expected. The point at which the state of equilibrium is said to be reached may be configurable by the user. In one embodiment, the user may define the state of equilibrium to be the point at which the throughput rate has not varied by more than a certain percentage for a set period of time. In other words, when the throughput rate (or other output being monitored) has been within a set tolerance level for at least a specified period of time, the output is said to be within a state of equilibrium.

Next, each of the outputs is monitored in step 58 for a variation in the performance level from the equilibrium point or baseline, taking into account the tolerance level or variation factor set in step 56. If the program does not detect a significant variation in the performance level from the equilibrium point for any of the outputs, than the outputs may be continually monitored until the performance level of one or more of the outputs changes.

Once a variation exceeding the acceptable tolerance level or variation factor is detected in step 58, method 50 continues at step 60 where the audible sound associated with each output that falls outside the acceptable tolerance level is emitted, and the corresponding display window is re-focused on the screen in the selected position. In one embodiment, the amplitude of the audible sound may be adjusted according to the degree of change (from the state of equilibrium). Furthermore, the pitch or frequency of the audible sound may be varied to indicate whether the degree of change is positive or negative. For example, a high pitch audible sound may indicate a positive change in performance, and a low pitch audible sound may indicate a negative change in performance. However, those skilled in the art will appreciate that adjusting the amplitude, frequency, and/or pitch of the audible sounds is not a necessary component of the present invention. Thus, the system and method of the present invention may operate by providing an audible sound in conjunction with a visual display when a change in performance has been detected, and without the need to also vary the amplitude, frequency, and/or pitch of the audible sound.

As will be understood by those skilled in the art, numerous other "factors" of the audible sound may be used to indicate changes in the performance of an application. Thus, the factors described above are presented merely for purposes of example and not limitation. However, it is important to note that the scale for each of the factors (i.e., audio amplitude, pitch, phase, frequency, etc.) must be sufficient such that the emitted audible sound exceeds the discernable threshold for each factor.

Finally, as illustrated by loop 62 of method 50, steps 58 and 60 may be repeated for the duration of the application testing or until the user intervenes. Thus, changes in output may be repeatedly monitored to enable the user to document performance levels over time.

One example of the benefits of using the system and method in accordance with the present invention may be illustrated as follows: The user desires to run a test in order to monitor memory usage and message throughput rate for a particular application. After the application has been started and has reached the state of equilibrium, the user begins to perform other tasks and does not visually monitor the performance of the outputs. However, after some period of time memory usage increases by a significant amount, which is indicated to the user by emitting a unique audible sound with a magnitude of plus 10 and a high pitch, as well as by re-focusing the memory usage display window at the corresponding position on the screen. At the same time the message throughput rate drops by a significant amount, which is also indicated to the user by emitting a different audible sound with a magnitude of plus 10 and a low pitch and re-focusing the message throughput rate display window at the corresponding position on the screen. Thus, as illustrated by the example, the system and method of the present invention make it much easier for the user to monitor the performance of an application as well as to make the association between the memory usage increasing and the throughput rate dropping.

As those skilled in the art will appreciate, the present invention may support a finite number of outputs that may be monitored. In particular, this maximum number may be determined based upon the maximum number of audible sounds that may be supported within the discernable audible range and still be distinctive. However, the number of outputs that will require monitoring is preferably well within this limit so that the user is not overwhelmed with an indiscernible "wall" of sound, and so that the user is not required to keep track of an unmanageable number of outputs.

The option to re-focus the display windows may be a configurable choice where the user may elect to re-focus all windows where the output has changed (and for which audio is being emitted), or to have the audio emitted as muffled and giving the user the option as to whether they want to bring the display windows back into focus. Furthermore, once a display window has been re-focused on the screen, the display window should be minimized after a specified period of time (configurable by the user) when no more audio is being emitted and the state of the system is back in equilibrium.

One advantage of the system and method of the present invention compared to the completely "visual" systems and methods previously used is that the present invention does not require 100% cognitive focus. In particular, monitoring that is completely visual is inefficient when monitoring for a change in the state of the performance of an application over time. Being alerted to the change (and possibly the degree of change) through a combination of audible sounds and visual displays is more efficient.

Although the present invention has been described with reference to preferred embodiments, workers skilled in the art will recognize that changes may be made in form and detail without departing from the spirit and scope of the invention.

What is claimed is:

1. A method executed by a computer system for monitoring the performance of an application comprising:
    determining an output of an application that requires monitoring, the output representing a performance metric associated with the application;
    assigning an audible sound to the output, wherein the audible sound is comprised of a plurality of configurable parameters;
    positioning an output display window representing the output of the application at a desired user-defined location on a performance monitoring screen, wherein the user-defined location of the output display window on the performance monitoring screen determines a perceived sound location from which the audible sound associated with the output will be emitted, wherein the audible sound is emitted from the perceived sound location by adjusting a phase of the audible sound, and wherein adjusting the phase of the audible sound allows the audible sound to be emitted from the perceived sound location even though a physical speaker is not positioned at the perceived sound location;
    running the application by the computer system and allowing the application to reach a state of equilibrium;
    determining a baseline for the output when the application is in the state of equilibrium, the baseline representing an output level that is substantially constant;
    monitoring the output to detect a change relative to the baseline;
    emitting the audible sound assigned to the output from the perceived sound location and bringing the display window into focus on the performance monitoring screen when the detected change varies from the baseline by a predetermined amount; and
    adjusting the configurable parameters of the audible sound to indicate the existence of the detected change, the magnitude of the detected change relative to the baseline, and the degree of deviation from the baseline, wherein an amplitude of the audible sound is adjusted to indicate the magnitude of the detected change from the baseline, and wherein a pitch of the audible sound is adjusted to indicate a positive change or a negative change from the baseline.

* * * * *